US006968981B2

(12) United States Patent
Heukamp

(10) Patent No.: US 6,968,981 B2
(45) Date of Patent: Nov. 29, 2005

(54) DISPENSER FOR FREE-FLOWING PRODUCTS

(75) Inventor: Wolfgang Heukamp, Swisttal (DE)

(73) Assignee: RPC Wiko GmbH & Co. KG, Pulheim (DE)

( * ) Notice: Subject to any disclaimer, the term of this patent is extended or adjusted under 35 U.S.C. 154(b) by 313 days.

(21) Appl. No.: 10/386,263

(22) Filed: Mar. 11, 2003

(65) Prior Publication Data

US 2003/0231923 A1 Dec. 18, 2003

(30) Foreign Application Priority Data

Mar. 11, 2002 (DE) .......................... 202 03 882 U

(51) Int. Cl.[7] .............................................. G01F 11/00
(52) U.S. Cl. ...................................... 222/257; 222/494
(58) Field of Search ............................... 222/257, 494, 222/321.7, 260

(56) References Cited

U.S. PATENT DOCUMENTS

| | | | | |
|---|---|---|---|---|
| 4,913,322 A * | 4/1990 | Stoffler et al. | .............. | 222/494 |
| 5,687,884 A * | 11/1997 | Bodin et al. | ............. | 222/321.7 |
| 5,868,287 A * | 2/1999 | Kurokawa et al. | .......... | 222/494 |
| 6,371,333 B2 * | 4/2002 | Lorscheidt et al. | ...... | 222/321.9 |

FOREIGN PATENT DOCUMENTS

| | | |
|---|---|---|
| DE | 3844218 A1 | 7/1990 |
| DE | 4022499 A1 | 1/1992 |
| DE | G 92 12 242.6 | 1/1993 |
| DE | G 94 19 268.5 | 3/1995 |
| EP | 0 048 420 | 9/1981 |
| EP | 691 17 658 | 10/1996 |

* cited by examiner

*Primary Examiner*—Philippe Derakshani
(74) *Attorney, Agent, or Firm*—Sonnenschein Nath & Rosenthal, LLP

(57) ABSTRACT

A dispenser for distributing measured quantities of fluid to pasty product comprising a storage container with axially displaceable guide pistons and a dispenser head with a dispenser pump. A pump chamber is restricted by check valves at the entry and exit. A discharge channel is positioned downstream of the dispenser pump with an application opening that can be sealed by a sealing element. The dispenser head is designed with an application cap with a planar application surface closing the dispenser head in an axial direction and with an application opening centrally arranged in the application surface. The sealing element is designed in such a way, and arranged within the application surface, that the sealing element completely overlaps the application opening and is flush with the planar application surface.

21 Claims, 3 Drawing Sheets

DISPENSER FOR FREE-FLOWING PRODUCTS

BACKGROUND OF THE INVENTION

The invention relates to a dispenser for distribution of measured quantities of fluid to pasty products, comprising of a storage container with axially displaceable guide pistons and a dispenser head with dispenser pump arranged on the storage container, whose pump chamber is restricted by check valves at the entry and exit as well as a discharge channel inserted after the dispenser pump with an application opening that can be sealed by a sealing element.

Various devices are known for the measured distribution of fluid to pasty products for squeezing out the product from the storage container through an application opening, which differ fundamentally with regard to the structural design and function.

A dispenser of the foregoing described type is known from EP 0 048 420 B1. The dispenser consists of a hollow cylindrical storage container with a lower open end, which is sealed by an axially displaceable guide piston. The upper end of the storage container has a top surface with an inlet valve.

A dispenser head with a dispenser pump located within is arranged on top of this cylindrical storage container, whose pump chamber is restricted by check valves at the entry and exit as well as with a mouthpiece with an application opening inserted after the dispenser pump.

In the measured discharge of the product to be dispensed, through a downward directed outer pressure on the dispenser pump, whereby the pump compresses, the outlet valve is opened and the inlet valve is closed and the product in the pump chamber is squeezed out through the application opening of the mouthpiece.

Upon the release and the subsequent relaxing and expansion of the dispenser pump, the outlet valve is closed and the inlet valve is opened. The vacuum forming through the expansion of the dispenser pump in the pump chamber now causes a suction of new product from the storage container through the inlet valve of the top surface, whereby the piston moves further in the direction towards the top surface. This operation can be repeated until the storage container is empty and the piston has contact with the top surface.

From the German registered utility model G 92 12 242.6, in which a similar dispenser is described, it is known to seal the opening of the discharge channel with a loose plug. However, with a dispenser of this type the danger exists that the loose plug sealing the discharge opening will be lost or accidentally thrown away by the user after a single use of the dispenser, so that dirt or bacteria can seep into the unsealed discharge channel and spread within the dispenser. In addition, the possibility exists that a plug that has fallen to the floor will be inserted back into the discharge channel by a careless user without being cleaned. A further disadvantage in the use of a plug consists in the fact that in the insertion of the plug a small quantity of product will be squeezed out to the side of the plug and dampen the dispenser or the hands of the user.

To eliminate these described disadvantages, in the German registered utility model G 94 19 268.5 it is proposed to arrange at the lateral opening of the discharge channel a self-activating sealing check valve as an opening valve. The opening valve consists of an elastic sealing lip ring, which sits close laterally against the cylinder jacket area of a pivot in the off position, with the pivot arranged within or in front of the discharge opening. The diameter of the pivot is greater than the opening diameter of the relaxed sealing lip ring in the application setting.

SUMMARY OF THE INVENTION

Proceeding from this state of the art it is the object of the invention to form dispensers of the named type with a sealing element to seal the application opening, which is of the simplest possible design and installation and that does not hinder this operation in the administration of the product, for example in the application of the product on the skin.

The object is solved with a dispenser of the initially named type with the dispenser head designed with an application cap with a planar application surface closing the dispenser head in an axial direction and with an application opening centrally arranged in the application surface, and the sealing element for sealing the application opening designed in such a way, and arranged within the application surface, that the sealing element completely overlaps the application opening and forms a part of the planar application surface smoothly, without transition or border.

Through the inventive design of the dispenser with a planar application surface sealing the dispenser head above or laterally, the dispenser can not only be used for measured distribution of fluid to pasty products, but additionally the planar application surface can be used during the discharge of the product from the application arranged centrally in the application surface and after that for the uniform distribution of the discharged product, for example in application on the skin.

This potential use of the planar application surface makes it necessary that this surface remain even, which is why the sealing element, which completely overlaps the application opening, adapts itself to the application surface without transition or border, hence in a flush manner, and thus forms a part of the application surface.

In accordance with an advantageous design of the dispenser, the application opening is formed of two or more direct flow openings connected to each other by ridges. At the center of the application opening an upright standing spindle is arranged, whose height extends to the upper edge of the application surface. The sealing element made out of an elastic material, which has an outlet opening in its frontal area, is arranged in such a way that the outlet opening of the frontal area is located precisely above the spindle of the application opening.

In the off position, in which the elastic sealing element is located in its starting or original position, the frontal area of the sealing element lies on the application opening in such a way that its outlet opening lies on the spindle and thus hermetically seals the application opening.

In the application operation, in which the product to be discharged is pressed up and against the sealing element with pressure, the sealing element lifts itself from the spindle and thus releases the application opening. The product can now flow out unobstructed through the application opening and further through the outlet opening of the frontal area of the sealing element to the top.

In a development of the invention, the sealing element is a cylinder-shaped cap, which with its side wall is pressed into a recess of the application surface corresponding to the diameter of the cap. The recess in the application surface is so deep that the side wall of the sealing element is completely pressed in and the upper frontal area of the sealing element conforms to the application surface without edge or transition, and/or completes it. The side wall of the sealing element is, on the basis of its elasticity and through at least one annular ring developed on the exterior side, so firmly pressed in that in the application operation the frontal area can only protrude from the inside to the outside, the side wall on the other hand remains firmly in the recess.

Through the simple design of the sealing element a simple manufacture with advantage is possible and also a simple installation of the sealing element in the application surface of the dispenser. Since the manufacture of the sealing element can be performed separately from the remaining structural elements of the dispenser, conventional elastic raw materials can be used, for example thermoplastic elastomers (TPE, also known as thermoplastic rubber or elastoplastics or thermoplastics), nitrile rubber (nitrile-butadiene rubber or NBR), nitirile silicone rubber, silicone or other rubber-like raw materials.

In accordance with a further design of the invention, the sealing element is not manufactured in one piece, but rather together with the application cap and thus is manufactured in one part with the application surface in two-component injection molding. With the otherwise equal effect as with a seating element manufactured separately in one piece, this joint manufacturing results in the advantage that the separate manufacturing and installation of the sealing element in the application surface is omitted. However, disadvantageous is the fact that only raw materials can be used to manufacture the sealing element that form a binding connection with the raw material of the application cap. Thus this limits the possible raw material selection to all those raw materials that can be used in two-component injection molding, for example thermoplastic elastomers (TPE).

BRIEF DESCRIPTION OF THE DRAWING

Further advantages, features and properties of the invention are subsequently illustrated using exemplified embodiments in schematic drawings.

DETAILED DESCRIPTION OF THE PREFERRED EMBODIMENT

Figure 1:
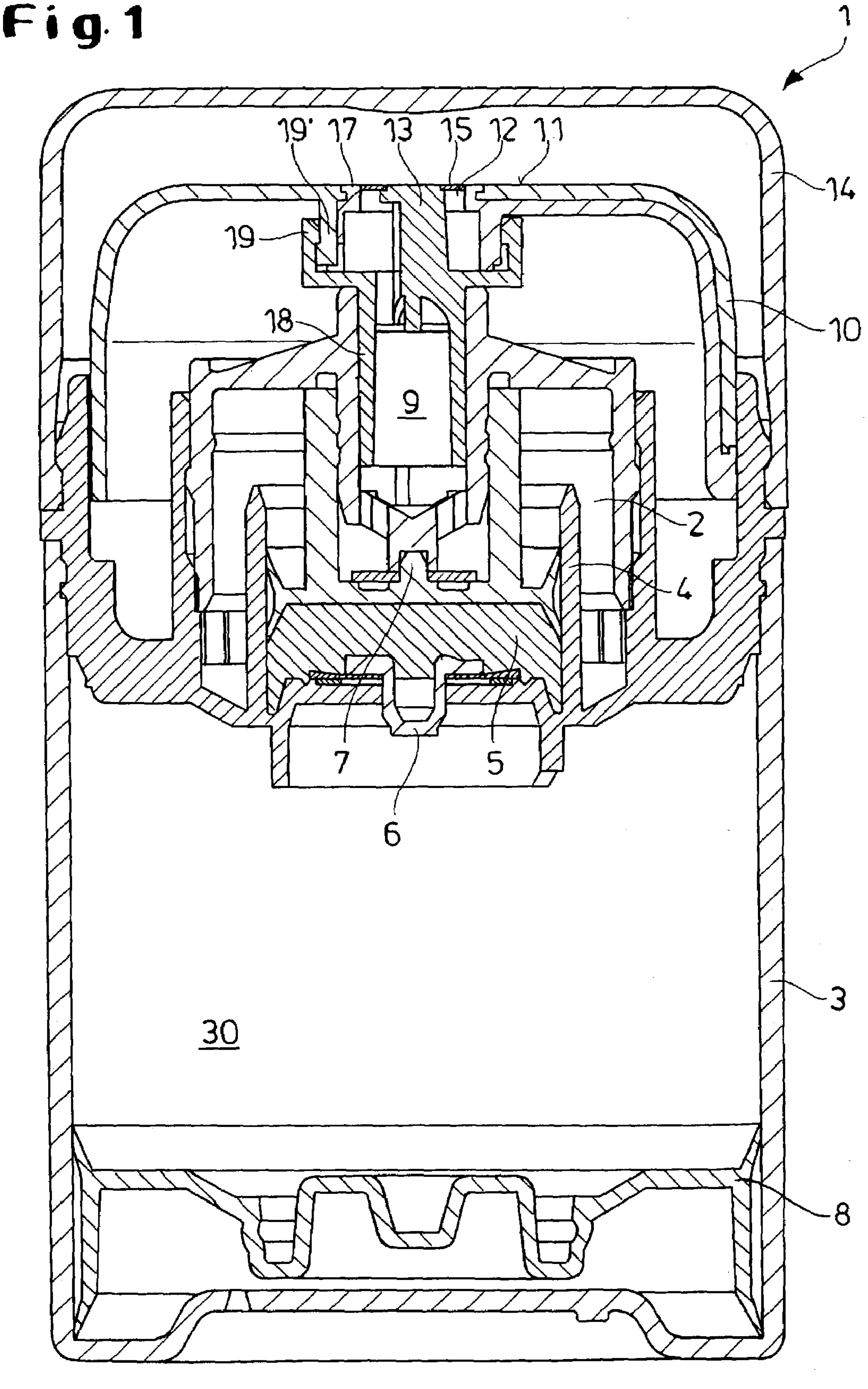
FIG. 1 illustrates a vertical cross-sectional view of a dispenser embodies the principles of the present invention.

In FIG. 1 a dispenser 1 for distribution of measured quantities of fluid to pasty products 30 is shown in a vertical cross-sectional view with a developmental form of the application cap 10 in accordance with the invention. The dispenser 1 consists in its basic components of a storage container 3 for accepting the product 30 to be dispensed with a guide piston 8, a dispenser pump 4 with pump chamber 5 and a dispenser head 2 with a discharge channel 9 and a planar application surface 11 with an application opening 12. When not in use, the dispenser head 2 is covered with a locking cap 14.

Within the dispenser head 2 a sealing pivot 18 is inserted from above, in which the discharge channel 9 is formed. This sealing pivot 18 has a spindle 13 centrally arranged, whose upper area seals flush or even with the application surface 11, and a rotary case 19 at a distance from the spindle 13.

A sealing element 15 is arranged in a recess 17 within the application surface 11 which surrounds the application opening 12 allowing the sealing element to completely overlap the application opening and to be flush with the application surface. In the shown exemplified embodiment, the sealing element 15 is manufactured jointly with the application cap 10, so that the sealing element 15 thus represents a part of the application surface 11.

The application cap 10 with the sealing element 15 has a collar 19' underneath the sealing element 15, which is inserted into the rotary case 19 in the installation of the application cap 10 on the sealing pivot 18. By this means it is guaranteed that the sealing element 15 is located precisely above the application opening 12.

The sealing element 15 has a small outlet opening 16 (FIG. 4) in its center, which in the installed state is seated precisely on the central spindle 13 and therewith hermetically seals the application opening 12 located below the sealing element 15.

In the application operation the product 30 is squeezed up through pump chamber 5 of the dispenser pump 4 with the inlet valve 6 closed and the outlet valve 7 opened through the discharge channel 9 in the sealing pivot 18. The product 30 presses from below against sealing the element 15, as a result of which it protrudes from the center outward and lifts itself from the spindle 13. The small central outlet opening 16 (FIG. 4) of the sealing element 15 is released as a result and the product 30 can now flow out unobstructed through the application opening 12 and then through the outlet opening 16 to the outside.

Figure 3:
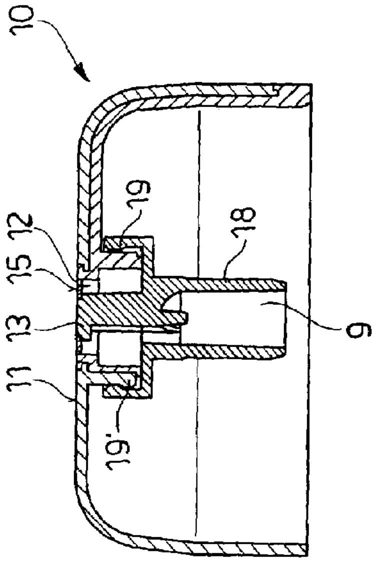
FIG. 3 illustrates the application cap of FIG. 2 in a vertical cross-sectional view.
Figure 2:
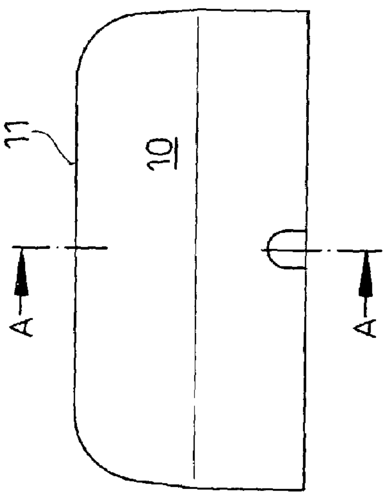
FIG. 2 illustrates the application cap of FIG. 1 in a front elevational view.
Figure 4:
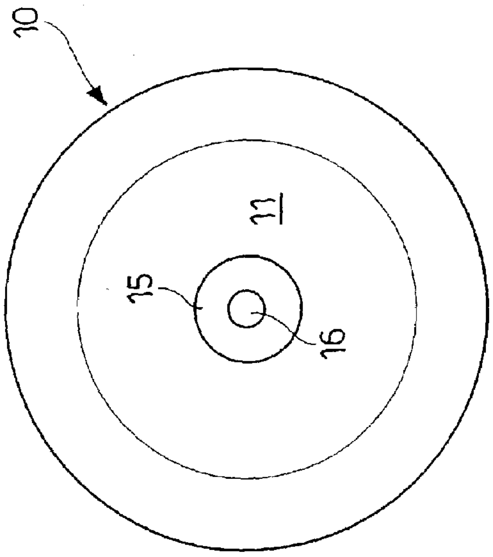
FIG. 4 illustrates a plan view of FIG. 2.

In FIGS. 2, 3 and 4 the application cap 10 is featured separately in a front view (FIG. 2), a sectional front view (FIG. 3) and in a plan view (FIG. 4) for a better overview. In particular, the individual display from FIG. 4 makes the relative sizes of sealing element 15 and its small outlet opening 16 clearer with reference to the application surface 11.

Figure 5:
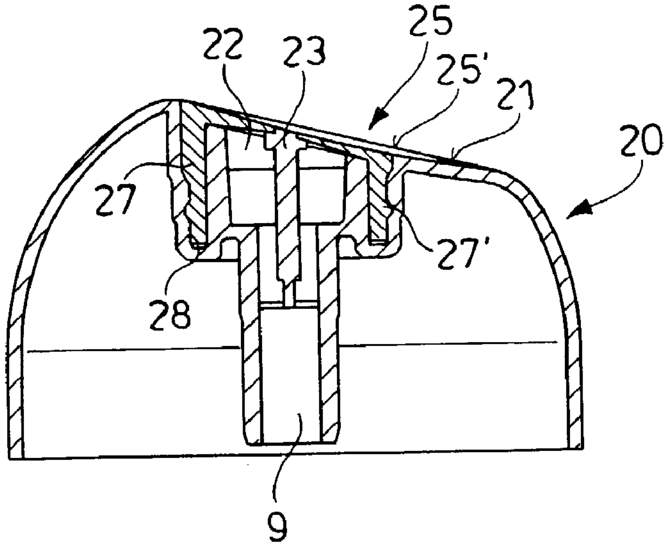
FIG. 5 illustrates a vertical cross-sectional view of a further specific embodiment of an application cap.
Figure 6:
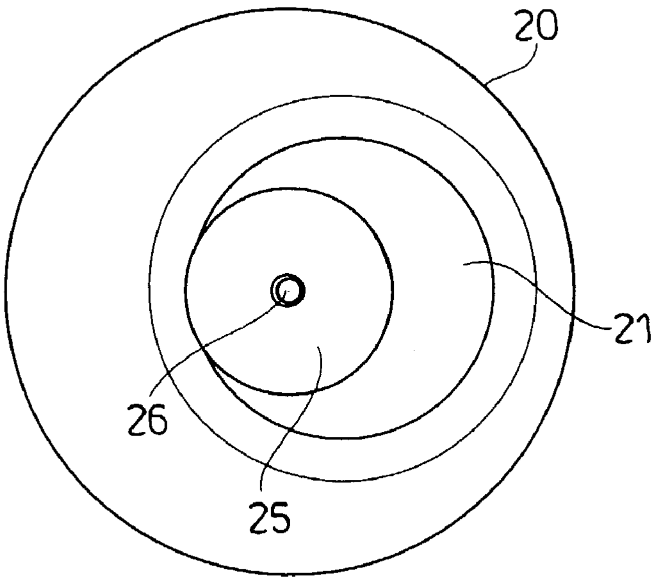
FIG. 6 illustrates a plan view of FIG. 5.

In FIGS. 5 and 6 an alternative developmental form of an application cap 20 of the invention and the alternative sealing element 25 allocated to it are shown. The application cap 20 does not have an application surface II aligned at a right angle to the dispenser axis as does dispenser head 10 of FIG. 1, but rather a planar application surface 21 is structured inclined to the dispenser axis here. This is particularly of advantage for the application, when the application surface 21 is to be used for direct application on the skin.

The sealing element 25 sealing the application opening is not manufactured jointly with the application cap 20 in this exemplified embodiment, but rather separately in one piece. The sealing element 25 comprises of a cylinder-shaped elastic cap with a round side wall 27 and a frontal area 25'. This sealing element 25 is so deeply pressed into a correspondingly round and deep recess 28 of the application surface 21 that its frontal area 25' completes the application surface 21 without transition at this point. To ensure that the sealing element 25 also retains its firm seat in the recess 28 in the protrusion during the application operation, at least one annular ring 27' is arranged outside on the side wall 27.

In FIG. 5 the application cap 20 is shown in the closed position. The sealing element 25 sits with its outlet opening 26 on the spindle 23, by means of which the outlet opening 26 and thus the application opening 22 located underneath are hermetically sealed.

In FIG. 6 the application cap 20 of FIG. 5 is shown in a plan view. Through this view the relative sizes are displayed more clearly. Since the sealing element 25 must be manufactured separately and must be anchored with its side walls 27 in the application cap 20, it is executed with significantly greater diameter and thus a considerable part of the application surface 21. This part is significantly slighter in application cap 10 with its sealing element 15, as can be gathered from FIG. 4.

The displayed exemplified embodiments do not necessarily show the only possible developments of the invention. Different dispenser types can also be combined with different dispenser head systems, provide they have an application surface and the development of the sealing elements in accordance with the invention can be practically retained thereby.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A dispenser for distribution of measured quantities of fluid to pasty product comprising:

a storage container with an axially displaceable guide piston, a dispenser head with a dispenser pump arranged on the storage container, the dispenser pump having a pump chamber which is restricted by check valves at an entry and an exit, a discharge channel downstream of the dispenser pump with an application opening sealable by a sealing element, the dispenser head having an application cap with an application surface that is planar closing the dispenser head in an axial direction and with the application opening centrally arranged in the application surface, and the sealing element being arranged within the application surface such that the sealing element completely overlaps the application opening and forms a part of the planar application surface without transition or border.

2. The dispenser according to claim 1, wherein the sealing element is formed as a cylinder-shaped cap, having a cylindrical side wall pressed deeply into a correspondingly round and deep recess in the application surface.

3. The dispenser according to claim 2, wherein the sealing element is provided with at least one annular ring on an outer side of its side wall.

4. The dispenser according to claim 3, wherein the sealing element is made of an elastic material.

5. The dispenser according to claim 1, wherein the sealing element is manufactured in one part with the application cap in a two-component injection molding process.

6. The dispenser according to claim 5, wherein the sealing element is manufactured with the application cap out of raw materials usable in a two-component injection molding process.

7. A dispenser for distribution of measured quantities of fluid to pasty product comprising:

a storage container with an axially displaceable guide piston, a dispenser head with a dispenser pump arranged on the storage container, the dispenser pump having a pump chamber which is restricted by check valves at an entry and an exit, a discharge channel downstream of the dispenser pump with an application opening sealable by a sealing element, an upright standing spindle being located at a center of the application opening, a height of the spindle extending to an upper edge of the application surface, the dispenser head having an application cap with an application surface that is planar closing the dispenser head in an axial direction and with the application opening centrally arranged in the application surface, and the sealing element being arranged within the application surface such that the sealing element completely overlaps the application opening and forms a part of the planar application surface without transition or border.

8. The dispenser according to claim 7, wherein the sealing element is formed as a cylinder-shaped cap, having a cylindrical side wall pressed deeply into a correspondingly round and deep recess in the application surface.

9. The dispenser according to claim 8, wherein the sealing element is provided with at least one annular ring on an outer side of its side wall.

10. The dispenser according to claim 9, wherein the sealing element is made of an elastic material.

11. The dispenser according to claim 7, wherein the sealing element is manufactured in one part with the application cap in a two-component injection molding process.

12. The dispenser according to claim 11, wherein the sealing element is manufactured with the application cap out of raw materials usable in a two-component injection molding process.

13. The dispenser according to claim 7, wherein the sealing element comprises a check valve and is made of an elastic material with an outlet opening in a center of its frontal area, which outlet opening, in an off position of the dispenser, engages air-tight against the spindle positioned within the application opening and which, in an application position of the dispenser, on the basis of a pump pressure, the sealing element is sufficiently elastic so as to cause the frontal area to protrude outwardly from the center, lifting the sealing element up from the spindle and releasing the application opening.

14. The dispenser according to claim 13, wherein the sealing element is formed as a cylinder-shaped cap, having a cylindrical side wall pressed deeply into a correspondingly round and deep recess in the application surface.

15. The dispenser according to claim 14, wherein the sealing element is provided with at least one annular ring on an outer side of its side wall.

16. The dispenser according to claim 15, wherein the sealing element is made of an elastic material.

17. The dispenser according to claim 13, wherein the sealing element is manufactured in one part with the application cap in a two-component injection molding process.

18. The dispenser according to claim 17, wherein the sealing element is manufactured with the application cap out of raw materials usable in a two-component injection molding process.

19. A dispenser for distribution of measured quantities of fluid to pasty products comprising:

a storage container with an axially displaceable guide piston, a dispenser head and a dispenser pump, the pump having a pump chamber restricted by check valves at an entry and exit, a discharge channel provided downstream of the dispenser pump with an application opening sealable by a sealing element, an application cap with a flat application surface closing the dispenser head in an axial direction, the application opening being centrally arranged in the application surface, and the sealing element completely overlapping the application opening and being flush with the flat application surface.

20. A dispenser for distribution of measured quantities of fluid to pasty products comprising:

a storage container with an axially displaceable guide piston, a dispenser head and a dispenser pump, the pump having a pump chamber restricted by check valves at an entry and exit, a discharge channel provided downstream of the dispenser pump with an application opening sealable by a sealing element, an application cap with a flat application surface closing the dispenser head in an axial direction, the application opening being centrally arranged in the application surface, an upright standing spindle being located at a center of the application opening, a height of the spindle extending to an upper edge of the application surface, and the sealing element completely overlapping the application opening and being flush with the flat application surface.

21. The dispenser according to claim 20, wherein the sealing element comprises a check valve and is made of an elastic material with an outlet opening in a center of its frontal area, which outlet opening, in an off position of the dispenser, engages air-tight against the spindle positioned within the application opening and which, in an application position of the dispenser, on the basis of a pump pressure, the sealing element is sufficiently elastic so as to cause the frontal area to protrude outwardly from the center, lifting the sealing element away from the spindle and releasing the application opening.

* * * * *